Nov. 17, 1970

R. E. GROJEAN 3,540,825

DOUBLE BEAM SPECTROMETER READOUT SYSTEM

Filed Jan. 18, 1968

INVENTOR
RICHARD E. GROJEAN
BY *Kenway, Jenney & Hildreth*

ATTORNEYS

United States Patent Office 3,540,825
Patented Nov. 17, 1970

3,540,825
DOUBLE BEAM SPECTROMETER READOUT SYSTEM
Richard E. Grojean, North Weymouth, Mass., assignor to McPherson Instrument Corporation, Acton, Mass., a corporation of Delaware
Filed Jan. 18, 1968, Ser. No. 698,890
Int. Cl. G01j 3/42
U.S. Cl. 356—88          4 Claims

ABSTRACT OF THE DISCLOSURE

A double beam spectrometer having a readout system in which both channels of the spectrometer are coupled to one input terminal of a logarithmic amplifier, the output of which is switched between two integrators so that one integrator is connected when the spectrometer light beam is passing through a reference cell and the other is connected when the beam is passing through the sample cell. The integrator outputs are connected through a switching circuit to a difference amplifier, which has its output connected to a pen recorder or the like through a low pass filter. The output is then proportional to the logarithms of the ratio between light transmitted through the sample and through the reference.

FIELD OF THE INVENTION

This invention relates in general to double beam spectrometers and more particularly to a system for producing as an output a signal proportional to the logarithm of the ratio between light transmitted through a reference cell and light transmitted through a cell containing a fluid sample to be analyzed.

BACKGROUND OF THE INVENTION

In general, a double beam spectrometer is an instrument in which a sample material is spectrally analyzed by alternately passing light from a suitable monochromatic source through a cell containing the sample to be analyzed and through an evacuated cell of substantially identical geometry, then measuring the light transmitted through the sample and through this reference cell. The absorption coefficient of the sample fluid for the particular wavelength of light is directly proportional to the logarithm of the ratio between the light transmitted through the sample cell and the light transmitted through the reference cell. In order to perform a complete analysis, it is desirable to vary the wavelength of the monochromatic light in a continuous fashion over the range of wavelengths of interest. In the vacuum ultraviolet region, at wavelengths above 1700 A., a hydrogen discharge lamp produces a continuum and may conveniently be used as the light source for a scanning monochromator. The light beam produced at the exit slit of the monochromator may be varied continuously over the range of wavelengths down to 1700 A. Below 1700 A., a hydrogen discharge light source emits a multi-line spectrum rather than a continuous spectrum. The intensity of the lines in this region may vary rather widely. Thus the readout instrumentation for use with a hydrogen light source in the wavelength region below 1700 A. must be capable of operation over an extremely wide dynamic range.

The photodetector of choice for most spectrometers of this type is a combination of a phosphor, such as sodium salicylate and a photomultiplier tube. In making a measurement, the light beam is alternately passed through the sample and the reference cell, and the output from each of the photomultipliers is integrated over at least part of the period when the light is being transmitted through the corresponding cell. With the wide range of light intensity resulting from the multiline structure, each integrator must cover a very wide dynamic range and, ideally, should be exactly matched to the other integrator over this range.

In order to obtain precise values of the intensity ratio, the two photodetectors, must also be extremely well matched, since any imbalance in the two channels will appear as a signal difference, thereby producing an error in the obtained value of absorption coefficient. All of these rather stringent requirements necessitate either acceptance of a lack of accuracy in the double beam spectrometer, or the imposition of very difficult instrumentation specifications.

SUMMARY OF THE INVENTION

The double beam spectrometer of the present invention employs a hydrogen lamp with a scanning monochromator as the light source. The light from the exit slit of the monochromator is directed at grazing incidence onto a mirror which vibrates at a frequency $f$, reflecting the light alternately through a reference cell and a sample material which may be either solid or fluid. The reference cell is usually evacuated and light transmitted through it is detected by a reference photodetector. In the case of a fluid, the sample to be analyzed is placed within the sample cell which is identical in geometry to the reference cell and light passed through this sample cell is detected by a sample photodetector. The outputs of each of the photodetectors are then coupled to a readout system.

The function of the readout system is to translate the two photodetector signals into a readout indication, such as a meter reading, pen recorder trace or entry in a storage medium, such as a magnetic tape. The output signal must be indicative of the light absorption of the material in the sample cell. The intensity of light transmitted through a thickness $x$ of a material at standard temperature and pressure may be expressed as $$I = I_0 e^{-ax}$$

where $I_0$ = the initial intensity of the light incident upon the fluid, and
$a$ = the absorption coefficient of the material in the sample cell.

The absorption coefficient, $a$, may then be expressed as $$a = -\frac{1}{x} \ln \frac{I}{I_0} \propto \log \frac{I_0}{I}$$

where $$\frac{I_0}{I}$$

is defined as the absorbance A, of the material.

Since the sample cell has a constant thickness of material, then this equation can be rewritten, $$A = (\log I_0 - \log I)$$

The light received by the reference photodetector is essentially equal to $I_0$ since this light is passed through a cell without any absorption and is therefore the equivalent of the light incident upon the material sample, but including the geometric factors of the cells. Thus the difference between the logarithm of the light intensity received at the reference photodetector and the logarithm of the light intensity received at the sample photodetector is directly proportional to the absorbance of the material in the sample cell.

In the readout system of the invention, the output signals from the signal photomultiplier and the reference photomultiplier are connected together and applied as the input to a logarithmic amplifier. A variable bias voltage is also coupled to this input point and may be adjusted to buck out noise such as dark currents from the two photomultipliers and scattered light from the monochromator. The output from the logarithmic amplifier is connected to a switching arrangement which provides that the output may be selectively coupled to one integrator, referred to as the sample integrator or to a second integrator, referred to as the reference integrator. The switching is so controlled that, when the light from the monochromatic source is incident upon the sample cell, the output from the logarithmic amplifier is connected to the sample integrator and, similarly, when the light from the monochromatic source is incident upon the reference cell, the output from the logarithmic amplifier is connected to the reference integrator.

The outputs from these two integrators are connected as the inputs to a difference amplifier through a second switching arrangement. The second switching arrangement is controlled so that a new value of one of the signals to the difference amplifier is provided each time the light beam is switched from one cell to the other. A new value for the difference is then produced at a frequency $2f$. The output of the difference amplifier is connected through a filter to an output indicator such as a meter or pen recorder or a storage medium, such as magnetic tape. The filter on the output of the difference amplifier is selected to pass only signals at a frequency less than the frequency $f$, at which the monochromatic light switches between cells.

The system above described yields several distinct advantages over the conventional prior art systems. By placing the logarithmic amplifier before the integrators, it is possible to use only one such amplifier and thereby eliminate switching during measurement between the photodetectors and the amplifier. A single bias voltage may be used to buck out the noise signals from both channels, thereby increasing the number of common components in the "dual channel" system. This in turn provides for a lower probability of differences between the channels giving rise to error signals. In this arrangement, the signal produced is actually $\int \log I$ rather than $\log \int I$. However this approximation is sufficiently accurate when the signal does not vary substantially during the sampling cycle. If the sampling cycle is kept sufficiently small with respect to the sweep speed of the scanning monochromator this condition is achieved.

By generating a new output signal from the difference amplifier for every shift of the incident light from one cell to the other, every two successive difference values have one signal in common. By introducing the low pass filter at the output of the difference amplifier, a change in the level of the light intensity incident upon the sample cell from that which existed from the preceding half cycle on the reference cell, does not result in that false difference signal being transmitted to the output indicators.

DESCRIPTION OF THE PREFERRED EMBODIMENT

Figure 1:
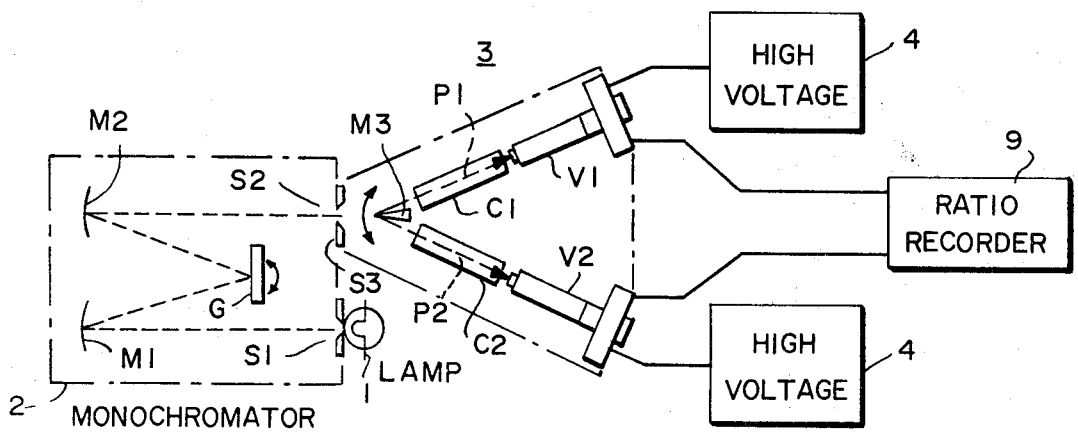
FIG. 1 is an illustration in block diagrammatic form of the spectrometer system of this invention.

With reference now to FIG. 1, there is illustrated the overall double beam spectrometer. The light from lamp 1 is spectrally diffracted by a scanning monochromator 2 and the output beam from this monochromator is directed into a double beam spectrometer 3 including a pair of photodetectors $V_1$ and $V_2$. The photodetectors $V_1$ and $V_2$ are typically formed of photomultipliers with a phosphor, such as sodium salicylate positioned in front of the window to convert the ultraviolet radiation into light at longer wavelengths. The photodetectors $V_1$ and $V_2$ have their output signals coupled to ratio recorder 9, which compares the outputs from the photomultipliers and traces a record of the logarithm of the ratio between them.

The lamp 1 may be any suitable lamp generating light from a wavelength below 1000 A. up into the visible region. Such a lamp is described in U.S. Pat. No. 3,026,435. The light from the lamp 1 is passed through the entrance slit $S_1$ of the monochromator where it is collimated at mirror $M_1$ and directed onto the rotatable grating C. Light spectra diffracted from the grating are focused by a second mirror $M_2$ onto the exit slit $S_2$. As the grating rotates, successive increments of the light spectra cross the slit $S_2$ and are transmitted through it to the spectrometer 3.

The light beam passing through the exit slit $S_2$ of the monochromator enters the double beam spectrometer where it is alternately reflected along paths $P_1$ and $P_2$ by the oscillating mirror $M_3$. Light path $P_1$ passes through the reference cell $C_1$ to the reference photodector $V_1$ which is supplied with high voltage from high voltage supply 4. A light transmitted along path $P_2$ passes through the sample cell $C_2$ and is incident upon the photodetector $V_2$, which also is supplied from a high voltage source 4. The output signals from the two photodetectors $V_1$ and $V_2$ are connected to a ratio recorder 9.

The housing of the spectrometer 3 is evacuated and the standard cell $C_1$ is also usually evacuated. The material in the sample to be analyzed is placed within the sample cell $C_2$, which has the same geometry and window characteristics as cell $C_1$. The sample cells may be of any conventional type and may be operated either windowless with a differential pumping arrangement or may use a suitable window such as lithium fluoride. In the case of a solid sample material, cell $C_2$ would be replaced by the material itself.

Figure 2:
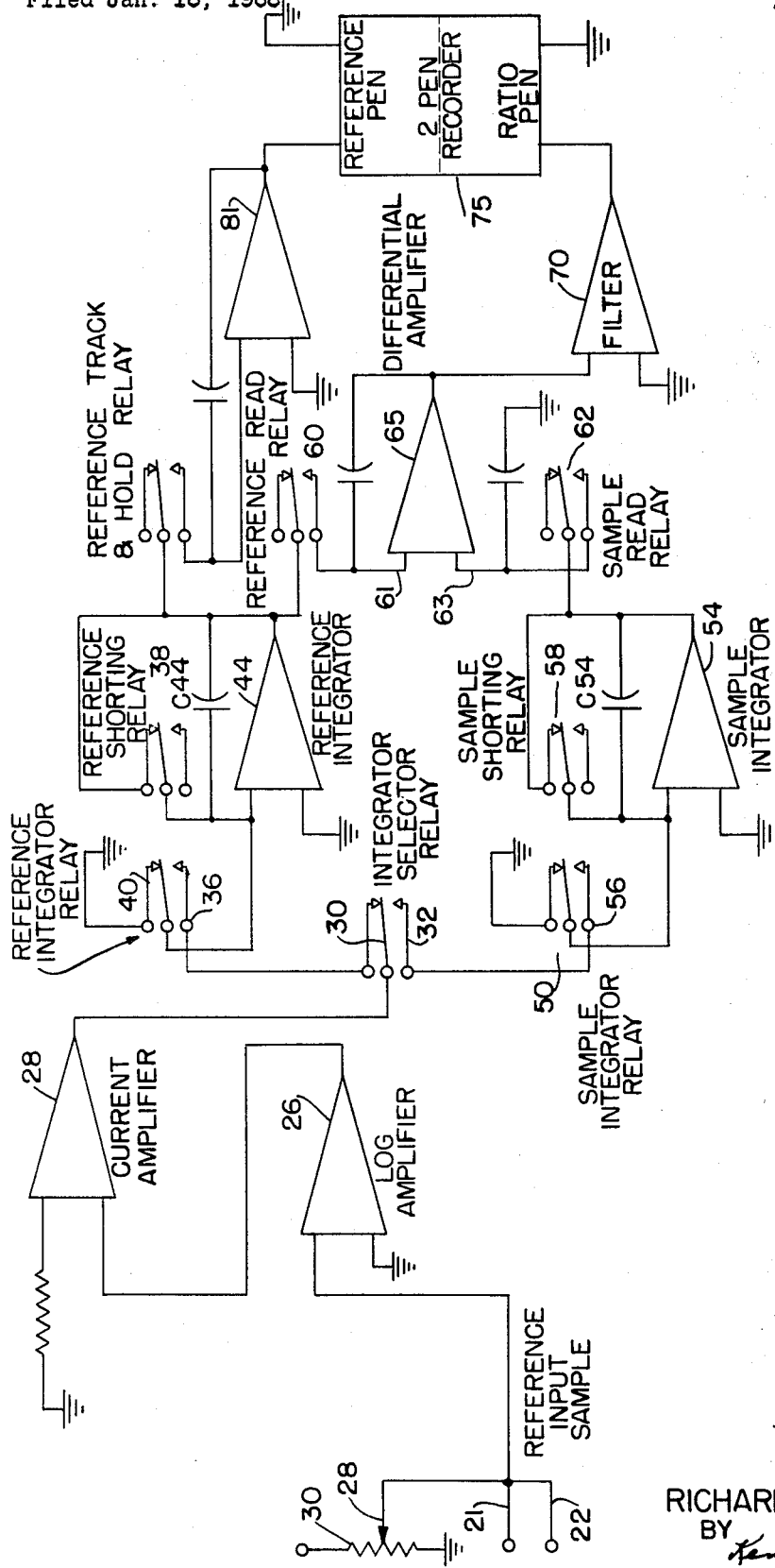
FIG. 2 is an illustration in block diagrammatic form of the readout system of the double beam spectrometer of this invention.

The ratio recorder 9 is illustrated in detail in FIG. 2. The input 21 from the reference photodetector and the input 22 from the sample photodetector are connected to one input terminal 24 of logarithmic amplifier 26. A bias potential for this input is derived from potentiometer tap 28 which can be adjusted on a potentiometer 30 to provide a bias voltage just bucking out the combined noise from photodetectors $V_1$ and $V_2$. The logarithmic amplifier 26 may be any conventional logarithmic amplifying circuit such as an operational amplifier with a diode feedback path. The output from logarithmic amplifier 26 is provided as an input to a current amplifier 28 which serves as a current pump. The output from amplifier 28 is connected directly to the arm 30 of the integrator selector relay 32. The selector relay 32 serves to connect the output signal from the amplifier 28 to one or the other of the integrator circuits. One contact of the selector relay 32 is coupled to a contact 36 on reference integrator relay 40, the arm of which is connected to one input terminal of the reference integrator 44. The second contact of this reference integrator relay 40 is connected directly to ground. The reference integrator 44 may be any suitable integrating circuit, but usually would take the form of an operational amplifier with an integrating capacitor $C_{44}$. The capacitor $C_{44}$ has connected across it a reference shorting relay 38.

The second contact of integrator selector relay 32 is connected directly to contact 56 on sample integrator relay 50. The other contact on this relay is grounded, while the center arm is connected to one input terminal of sample integrator 54. This integrator is substantially identical to the reference integrator 44.

The output of the reference integrator 44 is connected to the center arm of reference read relay 60 and a contact of this relay is connected to one input terminal 61 of difference amplifier 65. Similarly, the output from sample integrator 54 is connected to the center arm of sample read relay 62, which has one contact connected to input terminal 63 of difference amplifier 65. The output from the difference amplifier 65 is connected through filter 70 to the ratio pen of recorder 75. The output from reference integrator 44 is also connected directly through a reference track and hold relay 80 and an amplifier 81 to the reference pen of the recorder 75.

In the operation of the above system, the potentiometer arm 28 is first adjusted until the noise from both photodetectors 21 and 22, without any light incident upon them, is nulled out. The sample material is then placed within the sample cell $C_2$ or, in the case of a solid material, positioned in place of the cell $C_2$ and the monochromator is scanned slowly across the spectral range of interest.

Figure 3:
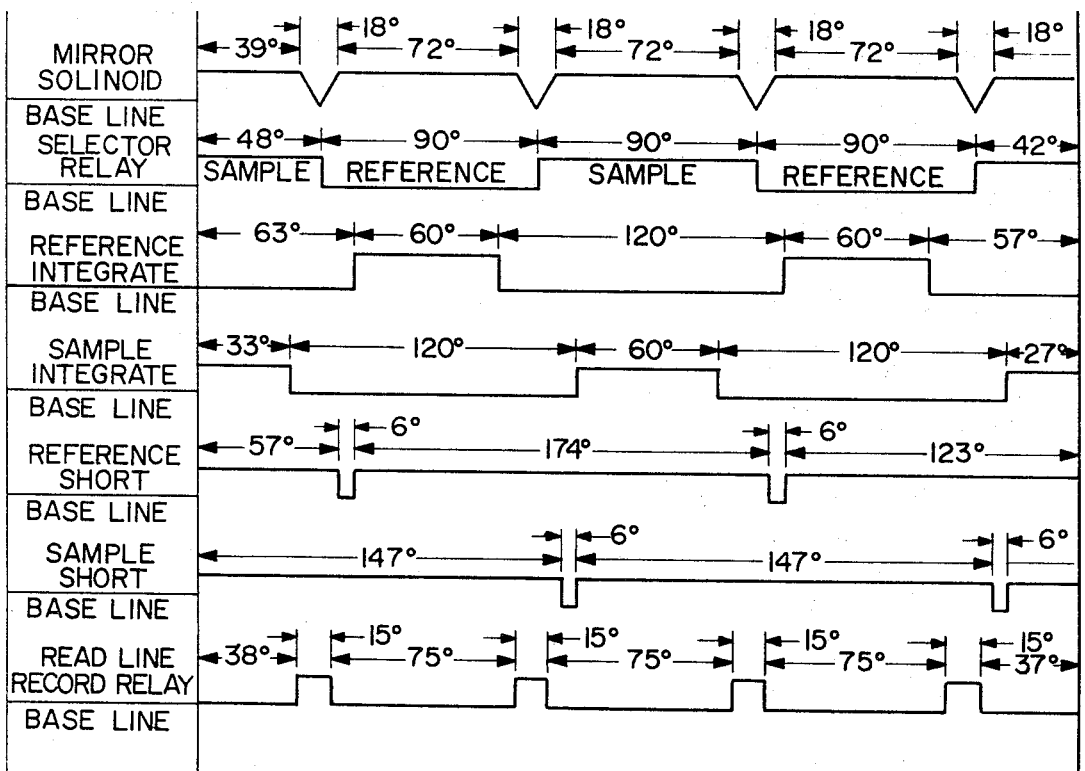
FIG. 3 is a graphical illustration of the control pulses for controlling the switching elements illustrated in FIG. 2.

The sequential operation of the remainder of this system can best be explained with reference to FIG. 3. The time coordinate in FIG. 3 is expressed as portions of one 360° cycle, which includes, two periods with light incident on couple cell $C_2$ and two periods with light incident on reference cell $C_1$. In FIG. 3, a signal above the base line indicates that the respective relay is energized. One half or 180° of this cycle equals then, one period of the frequency $f$, of alternation of the light source.

The mirror $M_3$ in the spectrometer 3 is rotated by a mirror solenoid (not shown) and this mirror solenoid is energized first with current of one polarity, and then with current of opposite polarity so that it changes position with each energization. When the mirror is in the position such that light is reflected along the path $P_1$, then the selector relay 30 is deenergized, so that the output from the current amplifier 28 is connected directly to one terminal on the reference integrator relay 40. Some 30° after the integrator selector relay 30 has been deenergized, the reference integrator relay 40 is energized thereby connecting the output of the current amplifier 28 through it to the input of the reference integrator 44. Since the shorting relay 38 is open, then for the remainder of this energization period of integrating relay 40 the integrator 44 integrates the logarithm of the signal from the reference photodetector $V_1$.

Before the mirror solenoid changes the position of the mirror to switch the light beam into the path $P_2$, the reference integrator relay 40 is deenergized, thereby grounding the input of reference integrator 44 and the selector relay 30 is deenergized coincident with the switching of the light beam onto path $P_2$. The light is now passing through the sample cell $C_2$ and, 30° after this change has taken place, the sample integrator relay 50 is energized. Since the selector relay 32 is deenergized, the output from current amplifier 28 is connected through relay 50 to the input of sample integrator 54 and the signal from photodetector $V_2$ is now integrated for the balance of the energization period of the sample integrator relay 50.

Shortly after the conclusion of this sample integration period, the reference read relay 60 and the sample read relay 62 are energized for a 15° period thereby coupling the outputs of integrators 44 and 54 to the input terminals 61 and 63 respectively of difference amplifier 65. The output from difference amplifier 65 represents the algebraic difference between these integrated values and this is coupled through a filter 70 to the ratio pen of recorder 75. If it is also desired to read out the value of the reference signal itself, then reference track and hold relay 80 is energized simultaneously with the energization sample and reference read relays.

At the conclusion of a read period following a sample integration period, shorting relay 38 on reference integrator 44 is closed for a short time, such as 6°, thereby discharging capacitor $C_{44}$ prior to the next energization of the reference integrator relay 40. During this period, however, the sample short relay 58 is left open while the input of sample integrator 54 remains shorted thereby maintaining the previous value on the output of sample integrator 54. At the conclusion of the energization period of the reference integrator relay 40, another energization of the reference and sample read relays occurs. While the sample integrator 54 output remains the same as for the previous reading, a new reference integrator value is now supplied to input terminal 61 and hence the output from difference amplifier 65 may differ from the prior reading. The filter 70 is a low pass filter which pass only frequencies below the frequency with which the mirror solenoid is energized. Thus only those differences which persist over one full cycle of operation are recorded on the ratio pen recorder 75.

A system of this type can tolerate very wide variations, such as a factor of $10^6$, in intensity of the light source from monochromator 1. Since the signal is compressed by virtue of logarithmic amplifier 26 before it reaches the integrators, the integrator design need not be one which encompasses such a wide range. As earlier pointed out, the generation of a difference signal every half cycle together with a low pass filter eliminates error signals due to change in the intensity of light source between two reference sample periods.

What is claimed is:

1. In a double beam spectrometer wherein monochromatic light is alternately passed through a reference cell to a first photodetector and through a sample material to a second photodetector with a specified frequency of alternation, the improved circuitry for producing an output signal proportional to the logarithm of the ratio between the light intensity received at said first photodetector and that received at said second photodetector comprising, a logarithmic amplifying element, means connecting the output of said first photodetector and the output of said second photodetector in common to one input terminal of said logarithmic amplifying element, first and second integrators, means for coupling the output of said logarithmic amplifying element to said first integrator only when said monochromatic light is being passed through said sample material;

a difference amplifier;

first means for holding the value of the output signal from said first integrator during a period when the output from said logarithmic amplifying element is connected to said second integrator, second means for holding the value of the output signal from said second integrator during a period when the output from said logarithmic amplifying element is connected to said first integrator, means for coupling and decoupling the output of said first integrator to one input of said difference amplifier and the output of said second integrator to a separate input to said difference amplifier, and, indicating means coupled to the output of said difference amplifier for providing an output indication of the difference between the signals from said first and second integrators.

2. Circuitry in accordance with claim 1 and including first means, which, when energized, holds the value of the output signal from said first integrator during a period when the output on said logarithmic amplifying element is not connected to said first integrator and second means for holding the value of the output signal from said second integrator during a period when said output signal from said logarithmic amplifying element is not connected to said second integrator, said coupling means between said integrators and said difference amplifier being controlled to couple the outputs from said integrators to said difference amplifier at every half cycle of said specified frequency, said output indicator being coupled to said difference amplifier output through a filter which passes only signals at frequencies below said specified frequency.

3. Circuitry in accordance with claim 1 and including a bias voltage means connected to the common lead between said first and second photodetectors and said logarithmic amplifying element, whereby noise signals originating in or transmitted through said photodetectors may be bucked out.

4. Circuitry in accordance with claim 1 wherein both said first and said second integrators include shorting relays, said first integrator shorting relay being actuated for a short period just prior to the coupling of the output from said logarithmic amplifying element to said first integrator; said second integrator shorting means being shorted for a short period just prior to the coupling of the output from said logarithmic amplifying element to said second integrator.

References Cited

UNITED STATES PATENTS

| | | | |
|---|---|---|---|
| 3,131,349 | 4/1964 | Cary et al. | 356—94 |
| 3,207,996 | 9/1965 | Sundstrom | 356—95 |
| 3,238,368 | 3/1966 | McPherson | 356—95 |

RONALD L. WIBERT, Primary Examiner

V. P. McGRAW, Assistant Examiner

U.S. Cl. X.R.

250—218, 226; 356—95

FO-1050
(5/69)

UNITED STATES PATENT OFFICE
CERTIFICATE OF CORRECTION

Patent No. __3,540,825__   Dated __November 17, 1970__

Inventor(s) __Richard E. Grojean__

It is certified that error appears in the above-identified patent and that said Letters Patent are hereby corrected as shown below:

Column 2, line 54 that portion of the formula reading $\frac{I_o}{I}$   should read   $\log \frac{I_o}{I}$

SIGNED AND
SEALED
MAR 9 1971

(SEAL)
Attest:

Edward M. Fletcher, Jr.
Attesting Officer

WILLIAM E. SCHUYLER,
Commissioner of Patents